United States Patent [19]
Schibler et al.

[11] Patent Number: 5,528,592
[45] Date of Patent: Jun. 18, 1996

[54] METHOD AND APPARATUS FOR ROUTE PROCESSING ASYNCHRONOUS TRANSFER MODE CELLS

[75] Inventors: Ross M. Schibler, San Mateo; Kai Y. Yang, Cupertino; P. Kingston Duffie, Palo Alto, all of Calif.

[73] Assignee: DSC Communications Corporation, Plano, Tex.

[21] Appl. No.: 188,671

[22] Filed: Jan. 27, 1994

[51] Int. Cl.⁶ .......................... H04L 12/56; H04Q 11/04
[52] U.S. Cl. ........................... 370/60.1; 370/94.1
[58] Field of Search .................. 370/60, 60.1, 94.1, 370/110.1, 58.1–58.3, 85.1, 85.13, 85.14, 94.2, 54, 68.1, 79, 14; 340/825.5, 825.51, 825.52

[56] References Cited

U.S. PATENT DOCUMENTS

| | | | |
|---|---|---|---|
| 4,484,326 | 11/1984 | Turner | 370/60 |
| 4,488,288 | 12/1984 | Turner | 370/60 |
| 4,488,289 | 12/1984 | Turner | 370/60 |
| 4,550,397 | 10/1985 | Turner et al. | 370/60 |
| 4,829,227 | 5/1989 | Turner | 370/60 |
| 4,849,968 | 7/1989 | Turner | 370/94 |
| 4,862,451 | 8/1989 | Closs et al. | 370/60 |
| 4,922,244 | 5/1990 | Hullett et al. | 340/825.5 |
| 4,947,388 | 8/1990 | Kuwahara et al. | 370/60 |
| 4,955,020 | 9/1990 | Stone et al. | 370/85.9 |
| 4,956,839 | 9/1990 | Torii et al. | 370/60 |
| 5,001,704 | 3/1991 | Narup et al. | 370/85.13 |
| 5,029,124 | 7/1991 | Leahy et al. | 364/900 |
| 5,029,164 | 7/1991 | Goldstein et al. | 370/95.1 |
| 5,050,166 | 9/1991 | Cantoni et al. | 370/94.1 |
| 5,062,106 | 10/1991 | Yamazaki et al. | 370/94.1 |
| 5,130,975 | 7/1992 | Akata | 370/60 |
| 5,130,984 | 7/1992 | Cisneros | 370/94.1 |
| 5,132,966 | 7/1992 | Hayano et al. | 370/79 |
| 5,144,619 | 9/1992 | Munter | 370/60.1 |

(List continued on next page.)

OTHER PUBLICATIONS

"Connectionless Cell Switching Schemes For Broadband ISDN" by K. Yamazaki et al, pp. 1–6, 1990.

Steven E. Minzer, "Broadband ISDN and Asynchronous Transfer Mode (ATM)", *IEEE Communications Magazine*, pp. 17–57, Sep. 1989.

A. Lyman Chapin, "Connections and Connectionless Data Transmission", *Proceedings of the IEEE*, pp. 1365–1371, vol. 71, No. 12, Dec. 1983.

Abdi R. Modarressi and Ronald A. Skoog, "Signaling System No. 7: A Tutorial", *IEEE Communications Magazine*, pp. 19–35, Jul. 1990.

L. G. Roberts, "The Evolution of Packet Switching", *Proceedings of the IEEE*, pp. 1307–1313, vol. 66, No. 11, Nov. 1978.

*Primary Examiner*—Benedict V. Safourek
*Assistant Examiner*—Ajit Patel
*Attorney, Agent, or Firm*—Baker & Botts

[57] ABSTRACT

An ingress processor (16) includes an ingress controller (34) that controls the flow of asynchronous transfer mode (ATM) cells placed in the ingress cell memory (32) by a cell loader (30). The ingress controller (34) links together ATM cells within the ingress cell memory (32) that correspond to a particular packet. The ingress controller (34) sends the beginning of message cell (BOM) to a route cell buffer (42) for processing by an ingress router (44). The ingress router (44) determines routing information from content addressable memories (72) and routed cache associative memory (73) corresponding to the BOM cell within the route cell buffer (42). A router controller (60) within the ingress router (44) generates a setup ATM cell containing the retrieved routing information and sends the setup ATM cell to the ingress processor (34) through the route cell buffer (42). The ingress processor (34) sends the setup cell, the BOM cell, a transmit agent (48) through a transmit agent cell buffer (46) for transmission out of the ingress processor (16). The transmit agent (48) transmits all subsequent cells of the packet. Routing information for the packet is also stored in a VCI table (50) for use by the transmit agent (48) such that further route determinations for subsequent cells within a packet need not be determined by the ingress router (44).

18 Claims, 1 Drawing Sheet

OTHER PUBLICATIONS

| | | | |
|---|---|---|---|
| 5,144,622 | 9/1992 | Takiyasu et al. | 370/85.13 |
| 5,150,358 | 9/1992 | Punj et al. | 370/84 |
| 5,163,045 | 11/1992 | Caram et al. | 370/60.1 |
| 5,226,039 | 7/1993 | Frank et al. | 370/85.14 |
| 5,237,564 | 8/1993 | Lespagnol | 370/60.1 |
| 5,280,476 | 1/1994 | Kojima et al. | 370/60.1 |
| 5,301,184 | 4/1994 | Uriu et al. | 370/94.1 |
| 5,315,586 | 5/1994 | Charvillat | 370/94.1 |

5,528,592

1

METHOD AND APPARATUS FOR ROUTE PROCESSING ASYNCHRONOUS TRANSFER MODE CELLS

TECHNICAL FIELD OF THE INVENTION

This invention relates in general to telecommunication network systems and more particularly to a method and apparatus for route processing asynchronous transfer mode cells.

BACKGROUND OF THE INVENTION

Conventional switching modules that process asynchronous transfer mode (ATM) cells require a determination of routing information for each ATM cell in order for proper message transmission. The determination of routing information for each ATM cell is performed through a full memory look up for obtaining the appropriate routing information. These full memory look ups take a significant amount of time to accomplish. Loss of packets and individual ATM cells which form specific packets can occur due to the delay time in determining routing information.

From the foregoing, it may be appreciated that a need has arisen for a method and device that determines route information for asynchronous transfer mode cells. A need has also arisen for a method and device that quickly retrieve route information without unnecessary memory access.

SUMMARY OF THE INVENTION

In accordance with the present invention, a method and apparatus for route processing asynchronous transfer mode (ATM) cells are provided which substantially eliminate or reduce disadvantages and problems associated with conventional ATM cell processing.

The present invention includes a route cell buffer that receives ATM cells corresponding to a beginning and end of a packet, wherein the packet is defined by a plurality of ATM cells. An ingress router determines routing information from the ATM cells received in the route cell buffer and generates a setup ATM cell and a teardown ATM cell containing the appropriate routing information for the packet. The ingress router accesses routing information from content addressable memory in response to ATM cells received by the route cell buffer. The routing information includes a routing label that determines an output port for packet transmission and a virtual circuit identifier that determines switching paths within a network to connect a source user to a destination.

The present invention provides for various technical advantages over conventional ATM cell routing processing systems. For example, one technical advantage is in storing and quickly accessing routing information for a particular packet. Another technical advantage is the ability to retrieve routing information without a full, time consuming memory access. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

2

Figure 1:
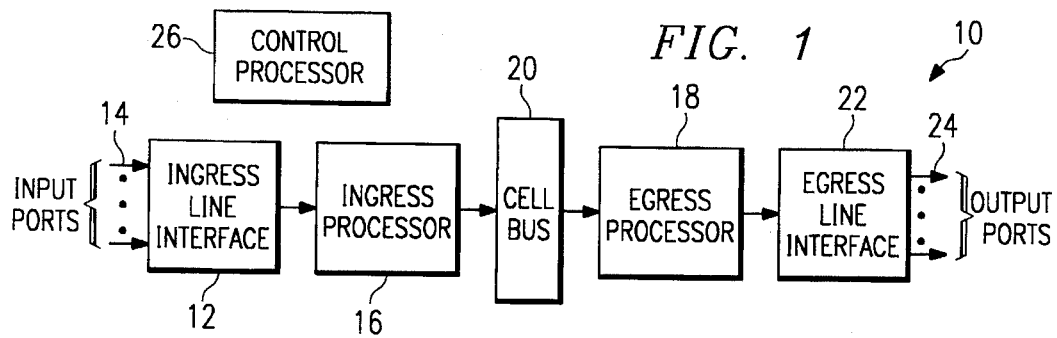
Figure 2:
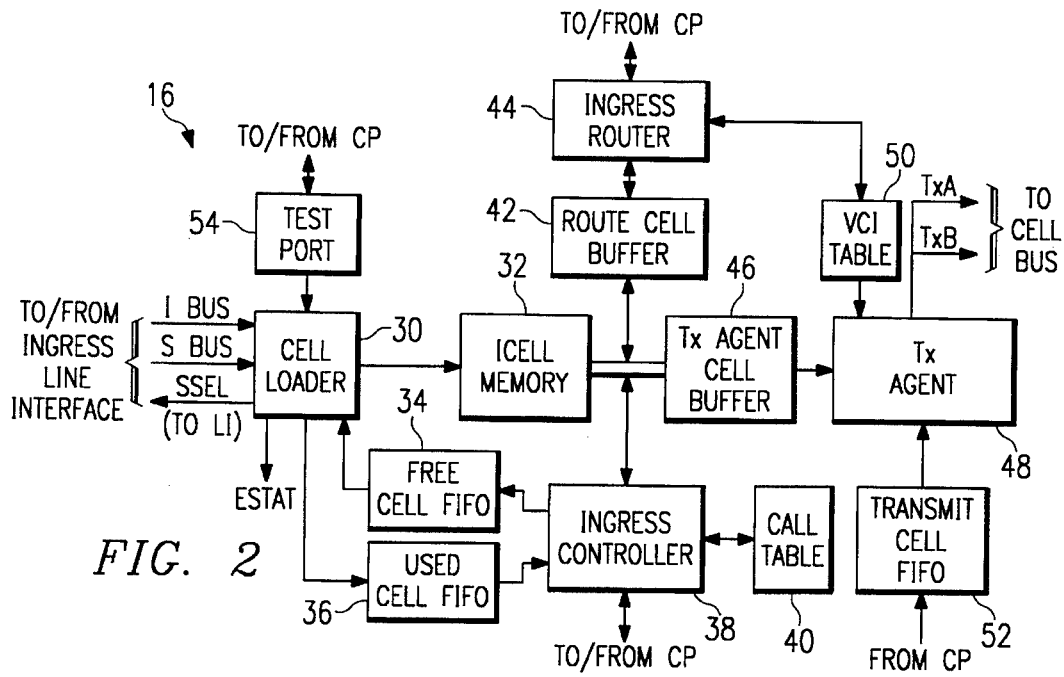
Figure 3:
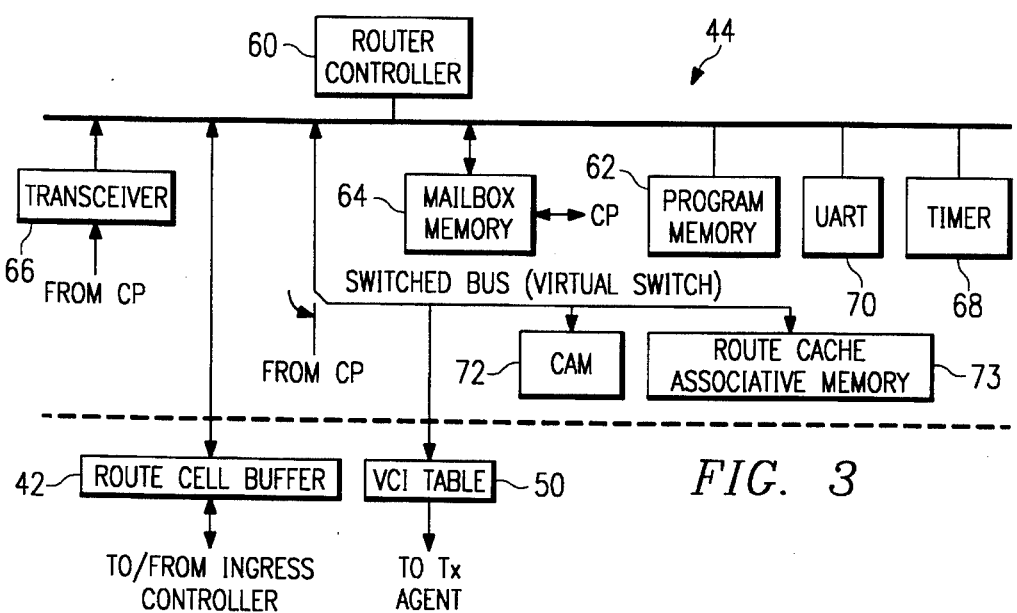

FIG. 1 illustrates a block diagram of a line processor within a broadband switching module for an integrated services digital network;

FIG. 2 illustrates a block diagram of an ingress processor within the line processor; and FIG. 3 illustrates a block diagram of an ingress router used by the ingress processor.

DETAILED DESCRIPTION OF THE INVENTION

FIG. 1 is a block diagram of a line processor 10 for a broadband switching module within an integrated services digital network. Line processor 10 includes an ingress line interface 12 receiving information off input ports 14. Ingress line interface 12 sends information to an ingress processor 16 that routes the information to an egress processor 18 through a cell bus 20. Information is transmitted from egress processor 18 through an egress line interface 22 onto output ports 24. A control processor (CP) 26 supervises operation of line processor 10. Though shown having single units, line processor 10 may have a plurality of ingress line interfaces 12, and egress line interfaces 22 coupled to cell bus 20 in order to handle a multitude of input ports 14 and output ports 24.

In operation, ingress line interface 12 performs a service adaptation function on the incoming traffic received from input ports 14. The incoming traffic may have any of several configurations, such as Frame Relay or Switched Multi-Megabit Data Service (SMDS) protocols. The incoming traffic is converted into asynchronous transfer mode (ATM) cells according to the service provided on a given input port 14. Each ATM cell typically comprises 53 bytes. Ingress processor 16 receives the ATM cells from ingress line interface 12 and performs protocol checks, determines routing paths for the ATM cells, and formats each ATM cell into a 64 byte block. Appendix A shows the 64 byte block of a formatted ATM cell with the shaded area identifying the 53 byte ATM cell placement. Appendix A also has descriptions of some of the fields within the formatted ATM cell. Further information on the content of ATM cells can be found in Bellcore specification TR-TSV-000772. Ingress processor 16 generates a setup ATM cell and a teardown ATM cell that carry routing information to open and close a transmission link, respectively, and transfers the setup ATM cell, and other formatted ATM cells, the teardown ATM cell to egress processor 18 through cell bus 20. Further information on setup and teardown cells can be found in copending U.S. patent application Ser. No. 08/188,559, entitled "Method of Transmitting Call Information Prior to Establishing a Connection Path", which is incorporated by reference herein.

Egress processor 18 identifies formatted ATM cells corresponding to a particular message and effectively places corresponding formatted ATM cells into a particular packet for output transmission. Egress line interface 22 receives each packet from egress processor 18 and converts the packets from formatted ATM cells into the appropriate service specific traffic according to the appropriate output port 24. Further information on egress processing can be found in copending U.S. patent application Ser. No. 08/339, 301, entitled "Apparatus and Method for Processing Asynchronous Transfer Mode Cells", which is incorporated by reference herein. The present invention lies within ingress processor 18 and is discussed in detail as follows.

FIG. 2 is a block diagram of ingress processor 16 within line processor 10 of the broadband switching module.

Ingress processor 16 includes a cell loader 30 that receives ATM cell information from ingress line interface 12 and transmits formatted ATM cells to an ingress cell (ICELL) memory 32. Locations within ICELL memory 32 are accessed through the use of a free cell first in, first out (FIFO) buffer 34 and a used cell FIFO buffer 36. An ingress controller 38 supervises formatted ATM cell flow within ingress processor 16. Ingress controller 38 responds to state information stored within a call table 40. Ingress controller 38 processes each formatted ATM cell and sends appropriate formatted ATM cells to a route cell buffer 42 for determination of route information by an ingress router 44. Further information on route generation can be found in copending U.S. patent application Ser. No. 08/188,310, entitled "Method and Apparatus for Generating Route Information for Asynchronous Transfer Mode Cell Processing", which is incorporated by reference herein.

For transmission purposes, formatted ATM cells are retrieved from ICELL memory 32 and stored in a transmit agent cell buffer 46 prior to transmission by a transmit agent 48. A virtual circuit identifier (VCI) table 50 provides routing information to ingress router 44 and transmit agent 48. Transmit agent 48 may also receive transmit cells generated by control processor 26 through a transmit cell FIFO buffer 52. Control processor 26 may also perform testing functions on cell loader 30 through a test port 54.

In operation, ATM cells from ingress line interface 12 enter ingress processor 16 on an input bus IBUS at cell loader 30. Cell loader 30 also receives ingress and egress status in multiplex form over a status bus SBUS. A status select SSEL signal from cell loader 30 selects either ingress status or egress status. Cell loader 30 may also be used to load ATM cells received from cell bus 20 for egress processor 18. Further information on cell bus operation can be found in copending U.S. patent application Ser. No. 08/015,695, entitled "High-Speed Packet Bus", which is incorporated by reference herein.

Cell loader 30 checks the status bus data for ingress to see if an ATM cell is available from ingress line interface 12. If an ATM cell is available, cell loader 30 formats the ATM cell into the 64 byte block shown in Appendix B and transfers the formatted ATM cell to ICELL memory 32. Cell loader 30 constructs a 'pseudo VCI' for placement within the formatted ATM cell from the message identification (MID) field of the ATM cell. The MID field identifies ATM cells belonging to a particular packet. The pseudo VCI is used to index state information within call table 40 and VCI table 50. Cell loader 30 also initializes the first four bits in the routing label field to specify a normal traffic cell type and the error code and next pointer fields are reset to zero. Cell loader 30 also generates an egress status signal to inform egress processor 18 of the availability of space on egress line interface 22.

Free cell FIFO buffer 34 and used cell FIFO buffer 36 carry cell locations of formatted ATM cells within ICELL memory 32 between cell loader 30 and ingress controller 38. Free cell FIFO buffer 34 provides pointers to free cell locations within ICELL memory 32 and used cell FIFO buffer 36 provides pointers to used cell locations within ICELL memory 32. Free cell FIFO buffer 34 receives a list of all free cell locations within ICELL memory 32 from ingress controller 38 as determined by control processor 26 upon initialization. In this manner, formatted ATM cells are stored in ICELL memory 32 in any available space and regardless of packet associations.

Ingress controller 38 processes formatted ATM cells within ICELL memory 32 through used cell FIFO buffer 36, route cell buffer 42, or an active chain as specified by state information within call table 40. An active chain is a group of cells that define a particular packet and indicate that a specific call is being processed through the system. Formatted ATM cells within a packet are chained together by reference to the next pointer field within each formatted ATM cell. The next pointer field within each formatted ATM cell points to a successive formatted ATM cell within the chain corresponding to a particular packet. Active chains have the highest priority, while formatted ATM cell locations from used cell FIFO buffer 36 have the lowest priority. Formatted ATM cells within route cell buffer 42 have a priority above used cell FIFO buffer 36 but below that of an active chain.

Call table 40 provides state information for ingress controller 38 as indexed by each pseudo VCI generated by cell loader 30 for the formatted ATM cells. State information included within call table 40 for each pseudo VCI generated by cell loader 30 includes the following:

State information (1 word) including,
    Unlink bit (1 bit),
    Link bit (1 bit),
    Waiting for COM/EOM (1 bit),
    Expected sequence number (4 bits),
    Other elements (1 bit),
First cell number in the chain (i.e., head of chain) (1 word), and
Last cell number in the chain (i.e., tail of chain) (1 word).

Upon receipt of each ATM cell, cell loader 30 places the formatted ATM cell in ICELL memory 32 in the cell location specified by free cell FIFO buffer 34. Cell loader 30 then places the cell location retrieved from free cell FIFO buffer 34 into used cell FIFO buffer 36. Ingress controller 38 access the formatted ATM cell from the cell location specified in used cell FIFO buffer 36 and verifies the MID against the segment type and the L2 payload length as specified in Bellcor specification TR-TSV-000772. For a beginning of message (BOM) cell, ingress controller 38 writes the BOM cell to route cell buffer 42 from ICELL memory 32. Ingress controller 38 sets the Link bit, Waiting For COM/EOM bit, the expected sequence number, and places the BOM cell location within the first and last cell number fields within call table 40 indexed by the pseudo VCI within the BOM cell as generated by cell loader 30. Ingress router 44 processes the BOM cell from route cell buffer 42 and generates a setup ATM cell, that includes route information determined by ingress router 44, for placement in route cell buffer 42 to be available for use by ingress controller 38. The setup ATM cell is used to establish a route for packet transmission.

For a continuation of message (COM) cell received at cell loader 30 and stored at ICELL memory 32, ingress controller 38 verifies the MID against the segment type and checks the L2 payload length and the Wait for COM/EOM bit. Ingress controller 38 compares the sequence number against the sequence number of the preceding formatted ATM cell, which could be a COM or BOM cell. Ingress controller 38 chains the COM cell to the preceding COM or BOM cell by writing this COM's cell location into the next pointer field of the preceding COM or BOM cell only if the Link bit is set. Ingress controller 38 updates call table 40 by writing the current COM cell location into the last cell number field and updates the expected sequence number in the corresponding field within call table 40. Since a route determination has been made with regard to the BOM cell, the COM cell need not be sent to route cell buffer 42 and remains in ICELL memory 32. If the Link bit is not set, the current COM cell is sent directly to transmit agent cell buffer 46.

For receiving an end of message (EOM) cell, ingress controller 38 verifies the MID against the segment type, checks the L2 payload length and the wait for COM/EOM bit, and compares the sequence number against the sequence number of the preceding formatted ATM cell, which can be a COM or BOM cell. Ingress controller 38 chains the EOM cell to the preceding COM or BOM cell by writing the EOM cell location to the next pointer field of the preceding COM or BOM cell. Ingress controller 38 also writes the EOM cell location to the last cell number field in call table 40. The Wait for COM/EOM bit within call table 40 is reset and writes the EOM cell to route cell buffer 42. Ingress router 44 processes the EOM cell from route cell buffer 42 and generates a teardown ATM cell for placement in route cell buffer 42 to be available for use by ingress controller 38. The teardown ATM cell includes route information determined by ingress router 44 for use in releasing a route after a packet has been sent.

When ingress router 44 completes route processing, a setup ATM cell is sent to ingress controller 38 through route cell buffer 42. Ingress controller 38 copies the setup ATM cell to transmit agent cell buffer 46. Ingress router 44 may or may not complete route processing before an EOM cell sets the Unlink bit, and resets the Link bit within call table 40 to establish an active chain. When the chain is active, linked formatted ATM cells can be sent directly to transmit agent cell buffer 46 without determining route information for each ATM cell within a packet.

Ingress controller 38 writes the BOM cell to transmit agent cell buffer 46 and obtains the next cell location from the next pointer field within the BOM cell and writes that cell location to the first cell number field in call table 40. The cell location of the BOM cell is now returned to free cell FIFO buffer 36 for use by newly received ATM cells at cell loader 30. Ingress controller 38 then writes the next COM cell to transmit agent cell buffer 46 and obtains the next cell location from the next pointer field of the COM cell and writes it to the first cell number field in call table 40. The cell location of the COM cell is returned to free cell FIFO buffer 36. This process repeats until ingress controller 38 writes the EOM cell to transmit agent cell buffer 46 and route cell buffer 42. When this occurs, ingress controller 38 resets the Unlink bit in call table 40, deactivating the chain, and returns the cell location of the EOM cell to free cell FIFO buffer 36. Ingress controller 38 then sends the teardown ATM cell generated by ingress router 44 to transmit agent cell buffer 46 and discards the BOM, COM, and EOM cells.

If ingress router 44 completes route processing before the EOM cell is handled by ingress controller 38, some formatted ATM cells corresponding to a packet may not be linked together because the link bit was reset upon generation of the setup ATM cell. In such an instance, unlinked formatted ATM cells are sent directly to transmit agent cell buffer 46 after processing by ingress controller 38. The unlinked formatted ATM cells corresponding to a specific packet then can be transmitted with the previously linked formatted ATM cells of the packet.

Transmit agent 48 receives ATM cells from either transmit agent cell buffer 46 or transmit cell FIFO 52. Transmit cell FIFO buffer 52 receives ATM cells generated by control processor 26 and sends control processor 26 generated ATM cells to transmit agent 48 for transmission onto transmitters TxA and TxB to cell bus 20. For transmission of ATM cells from transmit agent cell buffer 46, transmit agent 48 retrieves the pseudo VCI from each formatted ATM cell to index VCI table 50. VCI table 50 contains routing information determined by ingress router 44. Routing information within VCI table 50 includes a routing label indicating the output board destination of the formatted ATM cell and a VCI indicating the switching path through switching modules within the transmission network. Transmit agent 48 places the routing information from VCI table 50 into each ATM cell received from transmit agent cell buffer 46 before transmission onto transmitters TxA and TxB. The VCI and routing label initially placed within each formatted ATM cell by ingress controller 38 are merely default values and thus must be replaced by routing information from VCI table 50. There is no substitution and no use of VCI table 50 when transmitting ATM cells from transmit cell FIFO buffer 52.

FIG. 3 is a block diagram of ingress router 44 and its connection to other components of ingress processor 16. Ingress router 44 includes a router controller 60 operating under instructions from a program memory 62 and a mailbox memory 64. Program memory 62 receives code from control processor 26 over a transceiver 66 and interrupts from a timer 68. A universal asynchronous receiver transmitter (UART) 70 provides a serial port for debugging and a general purpose parallel input/output port. Routing information is stored in a content addressable memory 72 and route cache associative memory 73 for access by router controller 60.

CAM 72 includes information corresponding to destination and source addresses found in the payload section of each formatted ATM cell. Due to the limited size of CAM 72, typically a 64 bit width, an abbreviated version of the destination and source address is stored within CAM 72. Route cache associative memory 73 includes a full version of the destination and source addresses plus the routing label and the VCI for a variety of possible CAM entries accessing route cache associative memory 73. Though shown as two separate memories, CAM 72 and route cache associative memory 73 may be within a single memory having the features of a content addressable memory.

Upon receiving a BOM/EOM cell at route cell buffer 42, router controller 60 compares destination and source address information within the BOM/EOM cell with similar information within CAM 72. Upon finding a match, CAM 72 generates a cache entry which is used to index route cache associative memory 73. A bit compare of the information located within route cache associative memory 73, as accessed by the cache entry generated by CAM 72, with the BOM/EOM cell is performed to verify the correct cache entry. Upon verification, the routing label and VCI are retrieved from route cache associative memory 73 and stored within the BOM/EOM cell and VCI table 50 as indexed by the pseudo VCI generated by cell loader 30. If verification fails, a skip bit is set at the location in CAM 72 generating the cache entry and a new search is performed with CAM 72 from identifying the same location having the same cache entry to allow a search through remaining locations within CAM 72. Ordinarily, CAM 72 will not have more than one identical accessible location but the skip bit allows for this possibility to occur. If no match is found, router controller 60 must request routing information from control processor 26.

In operation, router controller 60 performs packet and route processing. Formatted ATM cells that are either BOM or EOM cells are sent to router controller 60 from ingress controller 38 through route cell buffer 42. Router controller 60 looks up the route in CAM 72 and route cache associative memory 73 corresponding to the formatted ATM cell in route cell buffer 42 and generates a setup or teardown cell for placement in route cell buffer 42 in order to be processed by ingress controller 38. Transceiver 66 downloads program code from control processor 26 into program memory 62 when ingress router 44 is initialized by control processor 26. Further communication between router controller 60 and the control processor 26 is performed through mailbox memory 64. Once routing information is determined for a particular BOM cell, VCI table 50 is appropriately updated and remaining cells within the packet associated with the BOM cell need not be sent through ingress router 44. Transmit agent 48 can access routing information from VCI table 50 for all cells within a particular packet.

In summary, routing information for a particular packet can be determined from the BOM cell of the packet. An ingress router receives the BOM cell from an ingress cell memory through a route cell buffer as controlled by an ingress controller. A router controller within the ingress router searches through a content addressable memory and a route cache associative memory to determine the routing information corresponding to the particular BOM cell. The routing information is placed within a setup ATM cell generated by the router controller and also placed in a VCI table in order to update all cells within a particular packet. A transmit agent transmits the setup cell, the BOM cell, and all remaining cells of a particular packet linked together by the ingress controller. The transmit agent can access the VCI table to ensure that all cells within the packet receive appropriate routing information. In this fashion, a determination of routing information for every ATM cell within a packet is not required.

Thus, it is apparent that there has been provided, in accordance with the present invention, a method and apparatus for route processing of asynchronous transfer mode cells that satisfy the advantages set forth above. Although the preferred embodiment has been described in detail, it should be understood that various changes, substitutions, and alterations can be made herein without departing from the spirit and scope of the present invention as defined by the following claims.

APPENDIX A

ICELL BOM FORMAT

|   | BYTE 0 | BYTE 1 | BYTE 2 | BYTE 3 | | | |
|---|---|---|---|---|---|---|---|
| 0 | X | BLOCKED POINTER | X | X | Port Type | X | Trunk ID (4) |
| 1 | RESPONSE CODE | ROUTING LABEL | | | | | |
| 2 | VCI | VCI | VCI | VCI | | VCI CHK (4) | |
| 3 | X | HEC | SEG TYPE (2) | SEQ # (4) | | MID (10) | |
| 4 | RSVD | BE TAG | BA SIZE | | | | |
| 5 | DA Type | 0001 | DESTINATION ADDRESS | | | | |
| 6 | DESTINATION ADDRESS | | 11111111 | 11111111 | | | |
| 7 | SA Type | 0001 | SOURCE ADDRESS | | | | |
| 8 | SOURCE ADDRESS | | 11111111 | 11111111 | | | |
| 9 | X+ HLPI (6 bits) | PL (2 bits) | X+ QOS (4 bits) | CIB (1 bit) | HEL (3 bits) | X + BRDG | |
| A | Element Length | Element Type | Element Value | Element Length | | | |
| B | Element Type (0×1 if carrier ID) | Carrier ID | | HE | | | |
| C | HE | HE | HE | HE | | | |
| D | DATA | | | | | | |
| E | DATA | | | | | | |
| F | Payload Length | Payload CRC | 00000000 | Error Code | | | |

(X are unused bits and/or bytes)

Reserved—There are two 1-octet fields, one in the header and one in the trailer of the L3_PDU, that are reserved. These fields are populated with zeros by both CPE and the SS.

BEtag—There are two 1-octet fields, one in the header and one in the trailer of the L3_PDU, that contain a beginning-end tag. These fields are populated with a binary encoded value ranging from 0 through 255. These two tags are used to form an association between the first and last segments of an L3_PDU.

BAsize—This 2-octet field gives the length, in octets, of the portion of the L3_PDU that extends from the beginning of the Destination Address field up to and including the CRC32 field, if present.

Destination Address—This 8-octet field contains two subfields, Address-Type and Address.

The Address_Type subfield occupies the 4 most significant bits of the field. The Address_Type contains the value 1100 when using an individual 60-bit address and the value 1110 for a 60-bit group address. All other values are not recognized by the SS.[1]

[1] In the multi-CPE access configuration, other Address-Type values may be used, as are described in the IEEE 802.6 Standard[(1)], for local communications among multiple CPE devices on the access DQDB.

The 60-bit Address subfield contains the SMDS address for which the L3_PDU is intended. For initial availability of SMDS, the address uses 10 digits, following a prefix of "1." The four most significant bits of the Address subfield are populated with the prefix value 0001.[2] The 40 bits which follow these four most significant bits contain the BCD encoded values of the 10 digits. The remaining 16 least significant bits are populated with 1s. Future addresses used for SMDS may require all 60 bits of this field, for example, for international addressing.

[2] The prefix value of 0001 is the country code for World Zone 1, which includes the United States of America, Canada, Bermuda, Puerto Rico, and some Caribbean islands. Future addresses used for SMDS may require a different country code.

Source Address—This 8-octet field also has two subfields, Address-Type and Address. The Address-Type subfield occupies the 4 most significant bits of the field. The Address_Type contains the value 1100 for an individual 60-bit address. All other values are not recognized by the SS. The Address subfield has the same format as the Address subfield in the Destination Address field.

Higher Layer Protocol Identifier (HLPI)—This 6-bit field is present to ensure alignment of the SIP format with the DQDB protocol format.

PAD Length (PL)—This 2-bit field indicates the number of octets in the PAD field to make the entire L3_PDU 32-bit aligned. The PAD Length may be found from the expression:

PAD Length=3—((number of Information octets+3)(mod4))

Quality of Service (QOS)—This 4-bit field is present to ensure alignment of the SIP format with the DQDB protocol format.

CRC32 Indication Bit (CIB)—This one-bit field indicates the presence or absence of the CRC32 field. If the CRC32 has been generated and is present, this bit is set to 1. Otherwise, this bit is set to 0.

Header Extension Length (HEL)—This 3-bit field indicates the number of 32-bit words in the Header Extension field, and is populated with the value 011 by both CPE and the SS.[3]

[3] Within the IEEE 802.6 Standard[(1)], this Header Extension Length field is used to support a variable length Header Extension field, which can be up to 20 octets. However, for SMDS purposes, the Header Extension field is fixed in length to 12 octets. Therefore, the Header Extension Length field is populated with the value 011.

Bridging—This 2-octet field is present to ensure alignment of the SIP format with the DQDB protocol format.

Header Extension (HE)—This is a 12-octet field. Octets not used for Header Extension elements as defined below are filled with extra octets, HE PAD, such that the overall Header Extension field is 12-octets.

Element Length—This one-octet field contains the combined lengths of the Element Length, Element Type, and Element Value fields specified in octets for the element.

Element Type—This one-octet field contains a binary encoded value which indicates the type of information found in the Element Value field. Section 4.2.1.1.1 specifies Element Types and formats.

Element Value—The content of this variable-length field depends upon the Element Type and its intended function.

HE PAD—This field can range from 0–9 octets in length. It is sized to make the overall Header Extension field 12 octets. If the HE PAD is present (greater than zero octets in length) it shall follow all Header Extension elements and begins with at least one octet of all zeros.

Information—This is a variable-length field that contains the user's information (or Level 3 SDU) and can be up to 9188 octets in length.

Payload—This field can range from 0 to 3 octets in length and contains zeros. It is sized to make the entire L3_PDU 32-bit aligned for each of processing, as indicated by the PAD Length field.

Payload CRC32—This 4-octet field may be present or absent, as indicated by the CRC32 Indication Bit. The CRC32 performs error detection for the L3_PDU fields from the Destination Address through the CRC32. If the CRC32 is generated by the CPE, it is performed according to Section 6.5.1.6 of the IEEE 802-6 Standard[(1)]. The SS delivers unchanged the value placed in the CRC32 field by the user, if any.

Length—This 2-octet field contains the same length as that found in the BAsize field.

What is claimed is:

1. An apparatus for route processing asynchronous transfer mode (ATM) cells, comprising:

a route cell buffer for receiving a beginning ATM cell and an end ATM cell corresponding to a packet, said packet defined by a plurality of ATM cells;

an ingress router for determining routing information for said packet from said beginning and end ATM cells received by said route cell buffer, said ingress router placing said routing information in said packet to prevent discarding of said packet or any ATM cells corresponding to said packet; and a virtual circuit identifier (VCI) table for storing said routing information determined by said ingress router, said VCI table providing routing information for each ATM cell of said packet during transmission of said packet, wherein said route cell buffer generates a pseudo VCI upon receipt of said ATM cells, said route cell buffer placing said pseudo VCI within each ATM cell, said routing information being indexed in said VCI table by said pseudo VCI.

2. The apparatus of claim 1, wherein said ingress router includes a content addressable memory cache and a route cache associative memory for accessing most recently used routing information, said content addressable memory cache accessing said route cache associative memory that contains said most recently used routing information in response to source and destination information within said beginning ATM cell.

3. The apparatus of claim 2, wherein said content addressable memory generates a cache entry into said route cache associative memory in response to a comparison with destination and source information within said beginning ATM cell.

4. The apparatus of claim 3, wherein said ingress router performs a bit compare of information within said route cache associative memory at a location indicated by said cache entry with said beginning ATM cell to verify proper destination and source information.

5. The apparatus of claim 2, wherein said route cache associative memory stores routing information within a virtual circuit identifier table accessed by each ATM cell within said packet upon packet transmission.

6. The apparatus of claim 1, wherein said routing information includes a routing label and a virtual circuit identifier, said routing label indicating an output port to transmit said packet, said virtual circuit identifier indicating a switching path for ATM cell transmission through a communication network.

7. The apparatus of claim 1, further comprising:
a transmit agent for transmitting ATM cells of a particular packet, said transmit agent accessing said VCI table in response to said pseudo VCI information within said ATM cells in order to place said routing information within each ATM cell.

8. The apparatus of claim 1, further comprising:
a control processor to update routing information within said ingress router, said control processor providing routing information to said ingress router to ensure that said packet includes routing information in order to prevent discarding of said packet or any ATM cells.

9. An apparatus for route processing asynchronous transfer mode (ATM) cells, comprising:
a memory for receiving and storing ATM cells;
a route cell buffer for receiving a beginning ATM cells and an end ATM cell corresponding to a packet, said packet defined by a plurality of said ATM cells;
an ingress router for determining routing information for said packet from said beginning and end ATM cells received by said route cell buffer, said ingress router generating a setup ATM cell and a teardown ATM cell for said packet in response to said routing information, said setup ATM cell and said teardown ATM cell operable to establish and release a route for said packet respectively, said setup ATM cell and said teardown ATM cell having a same format as said plurality of ATM cells corresponding to said packet;
a transmit agent for placing said routing information within each ATM cell of said packet, said transmit agent transmitting said setup ATM cell, said ATM cells corresponding to said packet, and said teardown ATM cell, each having said routing information as determined by said ingress router; and
an ingress controller for moving said ATM cells from said memory to said route cell buffer and said transmit agent.

10. The apparatus of claim 9, wherein said ingress router includes a content addressable memory cache and a route cache associative memory for accessing most recently used routing information, said content addressable memory cache accessing said route cache associative memory that contains said most recently used routing information in response to source and destination information within said beginning ATM cell.

11. The apparatus of claim 10, further comprising:
a virtual circuit identifier (VCI) table for storing said routing information determined by said ingress router, said VCI table providing routing information for each ATM cell of said packet during transmission of said packet.

12. The apparatus of claim 9, further comprising:
a call table for providing state information to said ingress controller, said ingress controller linking ATM cells into corresponding packets in response to information in said call table, wherein said call table is indexed by virtual circuit identifier information found within each ATM cell.

13. The apparatus of claim 9, further comprising:
a cell location FIFO buffer for accessing ATM cells stored in said memory, said ingress controller updating said cell location FIFO buffer with available cell locations within said memory.

14. A method of route processing asynchronous transfer mode (ATM) cells, comprising the steps of:
receiving a packet containing a plurality of ATM cells within a memory;
identifying a beginning ATM cell of the packet;
determining route information from the beginning ATM cell;
generating a setup ATM cell for the packet, the setup ATM cell having the same format as the plurality of ATM cells of the packet;
placing the route information in the setup ATM cell;
associating the route information with each ATM cell corresponding to the packet; and
transmitting the setup ATM cell to establish the route for the packet; and
transmitting the ATM cells of the packet in response to the route.

15. The method of claim 14, wherein said determining step comprises:
comparing source and destination address information from the beginning ATM cell with information within a route cache memory;
identifying a cache entry in response to a match from said comparing step; and
retrieving route information from a location within an associative memory corresponding to the cache entry.

16. The method of claim 14, further comprising the step of:
placing route information in a table accessed by a virtual circuit identifier found in each ATM cell;
loading each ATM cell with route information from the table prior to said transmitting step.

17. The method of claim 14, further comprising the step of:
linking ATM cells together corresponding to a specific packet.

18. The method of claim 14, further comprising the step of:
generating a teardown ATM cell for the packet, the teardown ATM cell having the same format as the plurality of ATM cells of the packet;
transmitting the teardown ATM cell to close the route for the packet.

* * * * *